Patented Sept. 7, 1937

2,092,114

UNITED STATES PATENT OFFICE 2,092,114

EASILY SOLUBLE DERIVATIVES OF DIALKYLAMINO-ALKYLAMINO ACRIDINES

Paul Emile Charles Goissedet and Robert Ludovic Despois, Choisy-le-Roi, France, assignors to Winthrop Chemical Company, Inc., New York, N. Y., a corporation of New York No Drawing. Application March 23, 1936, Serial No. 70,544. In Great Britain March 30, 1935

15 Claims. (Cl. 260—36)

This invention relates to the production of readily soluble derivatives of N-basically substituted amino-acridines, having great therapeutic value.

It is known that salts of N-basically substituted amino-acridines have in recent years attained great importance in therapeutics, particularly for the treatment of various forms of malaria. The salts employed up to the present time, chiefly the hydrochlorides, have the drawback of not being sufficiently soluble in water; for example, in the case of 2-methoxy-6-chloro-9-(alpha-diethylamino-delta-pentylamino)-acridine, the dihydrochloride has a solubility of only 2 to 3% in water at 20° C. (cf. Mauss & Mietzsch, Klinische Wochenschrift, (1933), p. 1276 Chem. Zentralblatt, (1933), II, 2026). This slight solubility does not cause any great inconvenience when the product is administered by ingestion, but it may be required in cases of urgency or in cases where there is gastric intolerance to administer the drug by injection of an aqueous solution (cf. Eckhardt, Arch. Schiffs- and Tropen-Hyg. Pathol. Therap. exot. Krankheiten, 37, page 475, Chem. Zentralblatt, (1934) I, 888). In such cases the slight solubility of the hydrochlorides in water is an inconvenience. The hydrochlorides take a long time to dissolve in cold water, even in making solutions which are considerably below saturation point, and this entails inconvenient loss of time.

It is, therefore, of great practical interest to find salts of basically substituted amino-acridines which are very soluble and rapidly dissolve in water. The acetates and the lactates, for example, fulfill these conditions quite well, but these substances are not easily obtainable in a crystalline state.

According to the present invention salts of basically substituted amino-acridines which are very soluble in water in which they dissolve rapidly can be obtained in a pure crystalline condition by the manufacture of their salts with alkyl-sulfonic acids, as for example, methane, ethane, propane, butane sulfonic acid and so on. These salts furnish neutral solutions which are well tolerated when administered by intravenous or intramuscular injections. This great solubility is the more remarkable in that the salts of other sulfonic acids such as benzene-sulfonic acid are only slightly soluble in cold water.

According to the present invention the new derivatives of basically substituted amino-acridines are prepared by causing basically substituted amino-acridines to react with alkyl-sulfonic acids, or by double decomposition, as for example by causing the sulfate of a dialkylamino-alkylamino-acridine to react with the barium salt of an alkyl-sulfonic acid. Particularly also such basically substituted amino-acridines which contain substituents, such as halogen, nitro, alkyl, amino, alkoxy and alkylmercapto may be converted into alkyl-sulfonic acid salts which readily and rapidly dissolve in water.

The invention is further illustrated by the following examples without being restricted thereto:—

Example 1.—80 grams of 2-methoxy-6-chloro-9-(alpha-diethylamino-delta-pentylamino)-acridine are dissolved in 500 ccs. of alcohol and 38.5 grams of methane-sulfonic acid are added. One liter of ethyl-acetate is added to the hot alcoholic solution and the mixture allowed to crystallize down on cooling. There is thus obtained an excellent yield of the di-(methane-sulfonate) of 2-methoxy-6-chloro-9-(alpha-diethylamino-delta-pentylamino)-acridine in the form of a yellow crystalline powder melting at 125° C. and having the theoretical composition. It is very easily soluble in water (at 20° C. 40 ccs. of water dissolve 60 grams of the salt giving an absolutely clear solution).

In spite of its great solubility this salt is not hygroscopic and can be kept perfectly when exposed to the air.

On replacing the methane-sulfonic acid by an equivalent quantity of ethane-sulfonic acid, the di-ethane-sulfonate of the 2-methoxy-6-chloro-9-(alpha-diethylamino-delta-pentylamino)-acridine is obtained. The salt corresponds to the methane-sulfonate. It melts at about 200° C. and is readily soluble in cold water. At 20° C. a more than 60% solution may be obtained.

On replacing 80 grams of the 2-methoxy-6-chloro-9-(alpha-diethylamino-delta-pentylamino)-acridine by 85 grams of 2.3-dimethoxy-6-nitro-9-(alpha-diethylamino-beta-hydroxy-gamma-propylamino)-acridine the dimethane sulfonate is obtained in the form of red-brown crystals, which are readily soluble in water.

In an analogous manner yellow to reddish salts are obtained which readily dissolve in water from the methane sulfonic acid and 2-methoxy-6-chloro-9-(alpha-diethylamino-delta-butyl-amino)-acridine, 6-chloro-9-(alpha-diethylamino-epsilon-pentylamino)-acridine, 2-methoxy-6-methyl-9-(alpha-diethylamino-beta-hydroxy-gamma-propylamino)-acridine, 9-(alpha-diethylamino-beta-ethylamino)-acridine, 2-(alpha-diethylamino-beta-ethylamino)-acridine, 3.6 - bis - (alpha - diethylamino - beta - hydroxy - gamma - propylamino) - acridine, 9-(para-diethylamino-ethoxyphenylamino) - acridine, 9-(piperidyl-N-ethylamino)-acridine, 9-(alpha-butylaminoethylamino)-acridine, 4-(diethylamino - ethylamino) - acridine, 9 - (para-aminomethyl-phenylamino)- acridine, 9-(diethylamino-ethyl-thiopropylamino)-acridine.

*Example 2.*—20.6 grams of the barium salt of butane sulfonic acid (obtained by treating an aqueous solution of butane sulfonic acid with excess barium carbonate, filtering and evaporating the filtrate to dryness in vacuo, white crystal powder which readily dissolves in water and contains 33.4% of barium) are dissolved in 250 ccs. of water and added to a solution of 26.7 grams of 2 - methoxy - 6 - chloro - 9 - (alpha - diethylamino-delta-pentylamino)-acridine $$+H_2SO_4+2H_2O$$

in 800 ccs. of water. The mixture is filtered with suction from the barium sulfate separating, the filtrate is evaporated in vacuo and the residue taken up in alcohol. The filtered alcoholic solution is treated with ether. In this manner the di-butane sulfonate of the acridine compound is obtained in the form of yellow crystals which melt at 158° C. and which are readily soluble in water.

*Example 3.*—20.3 grams of methane sulfonic acid silver (obtained by treating an aqueous solution of methane sulfonic acid with excess silver oxide, filtering and evaporating the filtrate to dryness in vacuo, white crystal powder which readily dissolves in water and containing 53.3% of Ag) are dissolved in 250 ccs. of water and added to a solution of 25.4 grams of the dihydrochloride of 2 - methoxy - 6 - chloro - 9 - (alpha - diethylamino-delta-pentylamino)-acridine (containing 2 mols of crystal water) in 750 ccs. of water. The silver chloride separating in a finely distributed form is filtered with suction with the addition of animal charcoal and the filtrate is evaporated to dryness in vacuo. The residue is taken up in a small quantity of alcohol, filtered and treated with acetic acid ethyl ester until crystallization takes place. The same product as indicated in Example 1, paragraph 1, is obtained.

We claim:—
1. Neutral salts of N-basically substituted aminoacridines with lower alkyl sulfonic acids.
2. Neutral salts of N-basically substituted 9-aminoacridines with lower alkyl sulfonic acids.
3. Neutral salts of alkylaminoalkylamino-acridines with lower alkyl sulfonic acids.
4. Neutral salts of 9-alkylaminoalkylamino-acridines with lower alkyl sulfonic acids.
5. Neutral salts of alkylaminoalkylamino-acridines with methane sulfonic acid.
6. Neutral salts of 9-alkylaminoalkylamino-acridines with methane sulfonic acid.
7. Neutral salts of 9-dialkylamino-alkylamino-acridines with lower alkyl sulfonic acids.
8. Neutral salts of 9-dialkylamino-alkylamino-acridines with methane sulfonic acid.
9. Neutral salts of 9-diethylaminoalkylamino-acridines with lower alkyl sulfonic acids.
10. Neutral salts of 9-diethylaminoalkylamino-acridines with methane sulfonic acid.
11. Neutral salts of 9-alpha-diethylamino-delta-pentylamino-acridines with lower alkyl sulfonic acids.
12. Neutral salts of 9-alpha-diethylamino-delta-pentylamino-acridines with methane sulfonic acid.
13. The neutral di-methanesulfonate of 2-methoxy - 6 - chloro - 9 - (alpha-diethylamino - delta-pentylamino)-acridine, forming a yellow crystalline powder melting at 125° C.
14. The neutral di-ethanesulfonate of 2-methoxy - 6 - chloro - 9 - (alpha - diethylamino - delta-pentylamino)-acridine, forming a yellow crystalline powder melting at about 200° C.
15. The neutral di-butanesulfonate of 2-methoxy - 6 - chloro - 9 - (alpha-diethylamino - delta - pentylamino)-acridine, forming yellow crystals melting at 158° C.

PAUL EMILE CHARLES GOISSEDET.
ROBERT LUDOVIC DESPOIS.